Sept. 12, 1961 E. W. SMITH ET AL 2,999,557
ACOUSTIC DETECTING AND LOCATING APPARATUS
Filed May 28, 1956
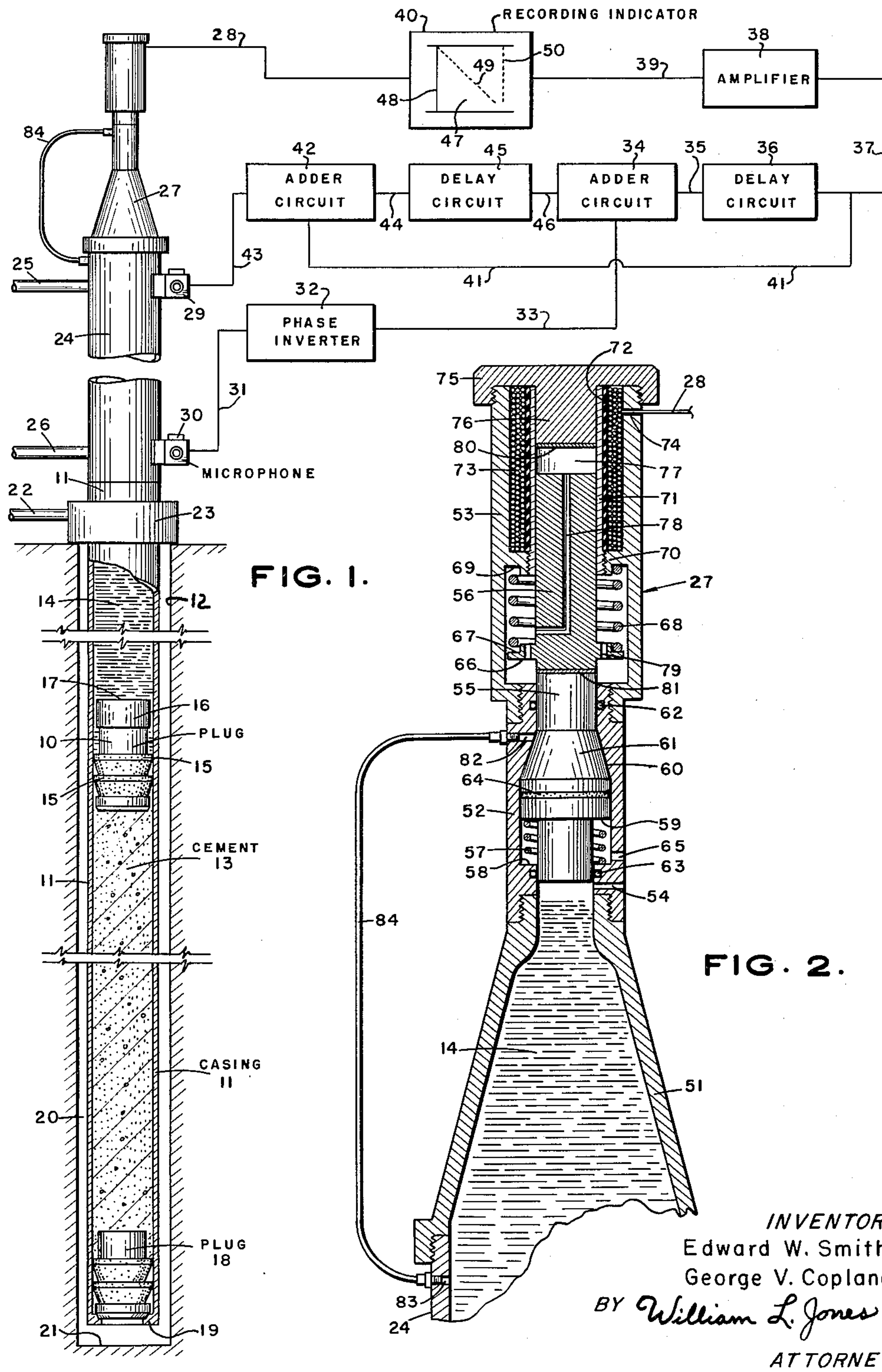
INVENTORS,
Edward W. Smith,
George V. Copland,
BY William L. Jones
ATTORNEY.

United States Patent Office 2,999,557 Patented Sept. 12, 1961

2,999,557 ACOUSTIC DETECTING AND LOCATING APPARATUS

Edward W. Smith, Melrose Highlands, Mass., and George V. Copland, Duncan, Okla., assignors to Halliburton Company, a corporation of Delaware Filed May 28, 1956, Ser. No. 587,765
20 Claims. (Cl. 181—.5)

This invention relates to utilizing acoustic energy in order to detect and obtain at least an indication of the location of surfaces and boundaries such as provide or correspond in location to acoustical discontinuities in an elastic medium.

More particularly, the invention relaes to apparatus useful in detecting and locating acoustical discontinuities denoting remote surfaces or boundaries within or adjacent to a quantity of liquid or liquid mixture which is bounded or contained by the walls of a conduit or passageway, such as in an oil or gas well by the walls of the cased or uncased bore hole.

As referred to herein, an acoustical discontinuity exists in an elastic medium where adjacent substances therein or portions thereof have substantially different acoustic impedances. For example, a body or object inserted in a conduit or passageway ahead of a liquid or liquid mixture may be constructed and arranged so that the acoustic impedance of at least a portion thereof is substantially greater or less than the acoustic impedance of the liquid or liquid mixture adjacent thereto. Also, an acoustical discontinuity will ordinarily exist where an abrupt increase or decrease in the cross-sectional area of a liquid-containing conduit or passageway occurs.

The invention may be applied to particular advantage in connection with the performance of certain operations in oil and gas wells or the like. For example, where an object such as a cementing plug is inserted into a well casing or conduit ahead of a displacing liquid which is pumped to force or move the object or plug downwardly therein, it is desirable for the operator at the surface to know with certainty that the object or plug continues to move downwardly as additional liquid is pumped into the casing or conduit behind it. If the object or plug stops prematurely, this may indicate that the liquid is undesirably escaping or leaking from the casing or conduit, such as through a split or ruptured portion thereof. Also, it is desirable for the operator to know with certainty when the object or plug is approaching, and the occasion of its arrival at a desired location or depth in the well. For example, the operator may want to stop or adjust the pump in time to prevent undesirably high pressure from being built up behind the object or plug after it has reached its lowermost or at rest position in the well.

It has heretofore been common practice to follow the downward travel of the top cementing plug by means of a weighted object which is suspended in the well on a wire measuring line or the like and is controlled by an operator at the surface. This procedure works fairly successfully in shallow wells or until a depth in the well is reached at which the weight of the unreeled wire line approaches that of the weighted object suspended therebelow. Then it becomes difficult, if not impossible, for the operator at the surface to know with certainty from the tension or "feel" of the line whether or not it is taut and the weighted object is resting on the plug at the time a measurement is made.

One object of the present invention is to provide an improved apparatus for detecting and obtaining at least an indication of the location of an acoustical discontinuity denoting a surface or boundary in an elastic medium which includes a quantity of liquid or liquid mixture bounded or contained by the walls of a conduit or passageway.

Another object of the invention is to provide an improved apparatus for detecting and obtaining at least an indication of the relative location of a plurality of acoustical discontinuities each denoting a remote surface or boundary in an elastic medium of the type described.

Another object of the invention is to provide an improved apparatus for detecting and determining changes in the location of an acoustical discontinuity denoting a moving or movable surface or boundary which is within or adjacent to a quantity of liquid or liquid mixture bounded or contained by the walls of a conduit or passageway.

Another object of the invention is to provide an improved apparatus for detecting and, if desired, following changes in the location of an acoustical discontinuity denoting a remote surface or boundary which is moving through a conduit or passageway ahead of a quantity of displacing liquid or liquid mixture being continuously pumped or forced thereinto.

Another object of the invention is to provide an improved apparatus for detecting and obtaining at least an indication of changes in the relative location of a plurality of acoustical discontinuities in an elastic medium, where each such discontinuity denotes a surface or boundary within or adjacent to a column of liquid or liquid mixture included in the medium and where at least one of such surfaces or boundaries is moving or movable in the medium.

Another object of the invention is to provide an improved apparatus for detecting and, if desired, following changes in the location of an acoustical discontinuity denoting a surface or boundary which is moving along a conduit or passageway ahead of quantity of liquid or liquid mixture and with respect to an acoustical discontinuity denoting a reference surface or boundary in an elastic medium which includes the moving liquid or liquid mixture.

Another object of the invention is to provide an improved apparatus for determining and, if desired, following changes in the location of a cementing plug or like object providing a movable or moving acoustical discontinuity in a quantity of liquid or liquid mixture which is bounded or contained by the walls of a conduit or passageway, such as by the walls of a cased or uncased bore hole.

A further object of the invention is to provide an improved apparatus for use in carrying out a method of cementing casing or the like in a well.

The invention involves the concept of propagating one or more pulses or plane waves of acoustic energy in an elastic medium which includes a column of liquid or liquid mixture and of detecting or receiving a portion of the propagated energy reflected from an acoustical discontinuity denoting the location of a surface or boundary in the medium. The acoustic energy travels generally lengthwise of the column and is of sufficiently low frequency so that its wavelength is long in relation to the diameter or width of the column. The wavelength depends, of course, upon both the frequency of the transmitted energy and the velocity of transmission of the energy through the particular elastic medium involved. For liquids and liquid mixtures commonly encountered, the frequency range of the acoustic energy will be well within the range of human hearing. For example, a sudden disturbance including largely frequencies in the range of from about 50 to about 3000 cycles per second has been found suited for use where a plane wave is to be propagated for a considerable distance through a liquid-filled well casing or hole of conventional size.

In one arrangement, the acoustic energy is transmitted from a source adjacent an end of the elastic column and is detected or received after reflection and arrival thereof at a point in the medium above the surface or boundary to be located. By recording or observing the time of arrival of the reflected energy at such point, information is made available from which at least an indication of the location of such surface or boundary may be obtained. If desired, the time of reception of the reflected energy at such point may be compared with the time of transmission of the pulse or plane wave giving rise to the reflected energy which is received. Where energy reflected from each of a plurality of surfaces or boundaries at different locations in the medium arrives at such point in the form of a succession of reflected or echo signals, the relative time of arrival and reception of the received signals may be compared to obtain information from which may be obtained at least an indication of the relative location of such surfaces or boundaries.

The foregoing and other objects and advantages of the invention will, it is believed, become more apparent from the following description when read in connection with the accompanying drawing wherein:

FIGURE 1 is a vertical view of a well equipped with apparatus in accordance with the invention, the well and apparatus below ground being shown mainly in cross-section and the apparatus above ground being shown partly in elevation and partly in schematic block diagram form; and FIGURE 2 is a vertical cross-sectional view of a portion of the apparatus shown above ground in FIGURE 1, showing in detail one form of acoustic energy transmitting apparatus which may be used in accordance with the invention.

Referring to the drawing in detail, and first to FIGURE 1 thereof, the arrangement which is there illustrated, and is hereinafter described, is an example of the application of the invention for the purpose of detecting and following changes in the location of a cementing plug 10 as it is pumped downwardly through a well casing 11, which is shown positioned in a bore hole 12 ready to be cemented in place.

The plug 10 is shown in an intermediate position within the casing 11, being above a quantity of cement mixture 13 and below a quantity of displacing liquid 14. The displacing liquid 14 may be water, oil, drilling fluid or other liquid or liquid mixture which is pumped into the casing 11 to move or force the plug 10 downwardly therethrough.

The cementing plug 10 may otherwise be of conventional design but at least a portion thereof should be suitably constructed and arranged so as to provide an acoustical discontinuity at a surface or boundary thereof. As illustrated, the plug 10 has a conventional outer portion which may be made of rubber or rubber-like material. Such outer portion is shaped to provide a series of flexible annular wipers 15 which closely but slidably engage the wall of the casing 11.

The plug 10 is shown as also including an upwardly extending central portion 16 the upper end of which provides a flat annular reflector surface 17 having a diameter less than the inside diameter of the casing 11. Such central portion 16 is of special construction in that it is made of a material the acoustic impedance of which is substantially different from that of substances, such as the displacing liquid 14, which are introduced into the portion of the casing 11 above the plug 10 so as to be adjacent the reflector surface 17 provided thereon.

For example, such central portion 16 may have, or contain substances having, a relatively high acoustic impedance. To this end, the portion 16 may be made of a plastic or resinous material, such as Epon resin, containing suitable additives or weighting substances, such as dispersed ferro-phosphorous particles. As an alternative, the central portion 16 may have, or contain substances having, a low acoustic impedance. Thus, in certain applications it may be satisfactory for the material of which the portion 16 is made to contain spaces or chambers which are filled with air or other suitable gaseous fluid. It should be noted, however, that compressible fluids such as air tend to undesirably reduce in volume when subjected to high pressure conditions such as commonly prevail in deep oil and gas wells.

Below the quantity of cement mixture 13 is a lower or bottom cementing plug 18, which may be of conventional design and may be made entirely of rubber or rubber-like material. The plug 18 is closely but slidably fitted within the casing 11 and is shown after having moved downwardly therein to a position engaging a plug seat 19, which is suitably provided on the wall of the casing 11 near the lower end thereof. As commonly constructed, the bottom plug 18 has a central frangible plate or diaphragm (not shown) which is adapted to rupture upon sufficient fluid pressure being built up thereabove in the casing 11. The arrangement is such that after the plate or diaphragm is ruptured, the cement mixture 13 is then permitted to pass through the ruptured portion of the plug 18, out of the lower end of the casing 11, and then upwardly along the annular space between the casing 11 and the walls of the bore hole 12.

A fluid 20, which may be water, oil, a drilling fluid, or perhaps well fluids from adjacent formations, is shown filling the space between the casing 11 and the side walls and bottom surface 21 of the bore hole 12. Ordinarily the fluid 20 will initially at least partially fill the casing 11. The arrangement is such that the fluid 20 is displaced out of the lower end of the casing 11 and thence upwardly around the casing 11 toward the mouth of the bore hole 12 as the bottom plug 18 moves downwardly toward its seat 19 and as thereafter the cement mixture 13 flows into place around the casing 11 after rupture of the plug 18, as aforesaid.

The fluid 20 should be permitted to flow or be conducted out of the bore hole 12 as it is displaced upwardly toward the mouth thereof. To this end, there is shown a pipe 22 which extends into a casing head 23 suitably provided around the casing 11 at the surface of the ground. The pipe 22 communicates through the casing head 23 with the annular space surrounding the casing 11 and at its remote end communicates with a slush pit (not shown) or other suitable receptacle for the fluid 20.

Above the casing 11, and forming an extension thereof above the surface of the ground, there is shown a plug conatiner 24 into which the bottom plug 18 and thereafter the top plug 10 are inserted prior to being pumped downwardly through the casing 11. An upper branch pipe 25 and a lower branch pipe 26 are shown connected to the side wall of the container 24. These pipes 25 and 26 provided means whereby liquids and liquid mixtures, such as the cement mixture 13 and the displacing liquid 14, may be introduced into the casing 11.

Above the plug container 24, and preferably threadedly or otherwise detachably connected thereto, is a housing 27 containing a source of acoustic energy which is controlled by signals supplied through the wires of an electrical cable 28 shown extending out of the wall of the housing 27 near the upper end thereof. As will appear more fully hereinafter, the acoustic energy source is in the form of apparatus which, for each control signal supplied thereto through the cable 28, is adapted to transmit a pulse or plane wave which is propagated in a downwardly direction through the plug container 24 and the casing 11.

The energy source within the housing 27 is located or mounted adjacent the upper end of what is in effect an elastic column which is the medium in which the acoustic energy is propagated and in which the reflector surface 17 on the top plug 10 is located.

In the arrangement shown, the elastic column includes all elastic substances, such as the displacing liquid 14, the cement mixture 13, and the rubber or rubber-like portions of the plugs 10 and 18, which are bounded or contained by the walls of the plug container 24 and casing 11 therebelow. Also, as shown best in FIGURE 2, the elastic column includes any liquid or other elastic substance which is present in the housing 27 below the energy source. Further, as shown best in FIGURE 1, the elastic column includes any liquid, such as the fluid 20, or other elastic substance which is present in the space between the lower end of the casing 11 and the bottom surface 21 of the well bore 12.

It will be noted that, in addition to the acoustical discontinuity which is provided in the elastic column at the reflector surface 17 of the plug 10, another acoustical discontinuity is provided at the bottom surface 21 of the bore hole 12. It is understood that acoustical discontinuities may also exist or be provided at other locations in the elastic column.

For example, it may be desirable for certain applications to construct and arrange the bottom plug 18 so that the acoustic impedance of at least a portion thereof is substantially different from substances in the column adjacent to a surface thereof. In this instance the discontinuity will move through the column with the plug 18 during part of the cementing operation.

As another example, a stationary acoustical discontinuity may exist or be provided at a convenient location in the column above the bottom surface 21, such as at or near the lower end of the casing 11. To this end, a section of the casing 11 or of the portion of the bore hole 12 below the casing 11 may be constructed or formed so that the diameter of the elastic column at a point in such section will be substantially different from that of the adjacent higher portion of the column.

In accordance with the present invention, one or more acoustical energy detectors are mounted at a convenient location along the elastic column above the highest acoustical discontinuity which is to be detected. As will appear more fully hereinafter, it is desirable for certain applications that such detectors be located near the acoustic energy source. In any event, the detectors should be adapted to pick-up or receive acoustic energy arriving thereat after traveling through at least a portion of the elastic column and at least one detector should be adapted to pick-up or receive acoustic energy reflected from acoustical discontinuities located therebelow in the elastic column.

From such detectors, together with suitable devices or electrical circuitry connected thereto, are derived signals which are utilized, as will appear more fully hereinafter, to obtain at least an indication of the location in the elastic column of acoustical discontinuities such as exist at the surfaces 17 and 21. The detectors and devices or circuitry connected thereto may each be of conventional design and, accordingly, are shown in simplified block diagram form. It is believed unnecessary to describe the operation of each device or circuit in detail.

In the arrangement illustrated, an upper detector or microphone 29 and a lower detector or microphone 30 are mounted in the wall of the plug container 24 and are exposed to the interior thereof. Each of the microphones 29 and 30 produces an output signal upon detecting or receiving acoustic energy which is traveling through the elastic column.

The lower microphone 30 has its output signal shown supplied through the wires of an electrical cable 31 to a phase inverter circuit 32, which may be a transformer or other device or circuit adapted to cause a phase shift of 180°. The thus inverted signal is then supplied through a cable 33 to an adder circuit 34, the output of which is a signal representing the vectorial sum of input signals supplied thereto.

The output signal of the adder circuit 34 is shown supplied through a cable 35 to a delay device or circuit 36, which may be a delay line or other device or circuit adapted to delay the signal for a predetermined period of time. This delay should correspond to the time required for acoustic energy to travel through that portion of the elastic column which is between the upper microphone 29 and the lower microphone 30.

The thus delayed signal is shown supplied through a cable 37 to an amplifier circuit 38, the output of which is in turn supplied through a cable 39 to the input terminals of a recording and indicating device 40. As will appear more fully hereinafter, the device 40 makes a record of signals supplied thereto through the cable 39. Also, the device 40 is shown connected to the remote end of the cable 28 extending out of the housing 27 and, through such cable 28, supplies electrical signals to control the acoustic energy source, as will appear more fully hereinafter.

The delayed output signal of the adder circuit 34 is also shown supplied through a cable 41 to an adder circuit 42. In addition, the output signal of the upper microphone 29 is shown supplied directly to the adder circuit 42 through a cable 43. The adder circuit 42 may be similar to the adder circuit 34 and its output is a signal representing the vectorial sum of the input signals supplied thereto through the cables 41 and 43, as aforesaid.

The output signal of the adder circuit 42 is shown supplied through a cable 44 to a delay device or circuit 45, which may be similar to the delay device or circuit 36. In any event the delay occurring in the circuit 45 should also correspond to the time required for acoustic energy to travel through that portion of the elastic column which is between the upper microphone 29 and the lower microphone 30. Since this time will ordinarily vary to some extent in particular applications, the delay devices or circuits 36 and 45 are each preferably adjustable to permit calibration thereof as desired.

The delayed output signal obtained from the device or circuit 45 is shown supplied through a cable 46 to the adder circuit 34 to which, as hereinbefore stated, the inverted output signal of the lower microphone 30 is also supplied. Thus, the output of the adder circuit 34 is a signal representing the vectorial sum of the input signals supplied thereto through the cables 33 and 46, as aforesaid.

It is desirable for any input signals arriving at the same time at either of the adder circuits 34 and 42 to be of substantially equal amplitude. To this end, suitable calibration or level control means may be provided, such as in the input portions of each of the circuits 34 and 42.

As illustrated, the recording and indicating device 40 is a conventional helix recorder having a chart 47 which is adapted to move upwardly at a constant slow speed. The device 40 includes suitable switching and circuit means (not shown) for controlling the movement of the chart 47 and for producing actuating or control signals which are supplied through the cable 28 to operate the acoustic energy transmitting apparatus mounted within the housing 27.

Such switching and circuit means may be operable to selectively supply an actuating or control signal whenever desired or to automatically supply a series of such signals. In any event, successive signals should be spaced apart sufficiently to permit one pulse or plane wave to be transmitted for each control signal supplied and to permit each transmitted pulse or wave to travel from the energy source through the elastic column to the farthest acoustical discontinuity therein denoting a surface or boundary to be located and then to return through the elastic column to the acoustical energy detectors or microphones 29 and 30 prior to the next pulse or wave being transmitted.

In the arrangement illustrated, the switching and circuit means within the device 40 is adapted upon the equipment being placed in operation to produce a series of uniformly spaced control signals which are supplied through the cable 28 to periodically energize the transmitting apparatus so that regular cycles of operation occur. The portion of each cycle which corresponds to an interval between successive energization periods is of sufficient duration to permit the apparatus to transmit a pulse or plane wave and also to permit the transmitted pulse or wave to make a round trip through the entire length of the elastic column. The switching and circuit means controls the movement of the chart 47 so that it moves upwardly a relatively short distance during each cycle of operation of the transmitting apparatus, as aforesaid.

As illustrated, the chart 47 is provided with a solid reference or base line 48 which extends vertically along the left side thereof and is made prior to the device 40 being placed in operation. The record making apparatus (not shown) within the device 40 is preferably calibrated or adjusted so that, coincident with the transmission of each pulse or wave at the energy source within the housing 27, it is ready to mark at a beginning point on the solid line 48. The construction and arrangement of the record making apparatus is such that any signals supplied through the cable 39 to the device 40 during a particular cycle of operation of the transmitting apparatus produce marks which appear on the chart 47 from left to right in the order of their arrival. Similarly, any signals supplied during the next and each succeeding cycle of operation of the transmitting apparatus produce marks which appear on the chart 47 from left to right in the order of their arrival but, since the chart 47 is moving continuously upward, at successively lower positions thereon.

In FIGURE 2 there is illustrated one form of acoustic energy transmitting aparatus which may be employed in accordance with the invention. This type of apparatus has been found suited for propagating a plane wave of acoustic energy for considerable distances through a liquid-filled well casing or hole of conventional size. Its energy output is a disturbance which includes largely frequencies in the range of from about 50 to about 3,000 cycles per second. The wavelength of the propagated energy is long in relation to the diameter or width of the elastic column in the well.

Referring to FIGURE 2, the housing 27 is there shown as including an upwardly and inwardly tapered lower section 51 which is screwed onto the upper end of the plug container 24 and functions as an impedance matching and coupling member interposed between the acoustic energy source and the main portion of the elastic column. If desired, such lower section 51 may be filled with a suitable elastic material, such as natural or artificial rubber, but it is shown filled with a portion of the displacing liquid 14 which is being pumped into the plug container 24 and casing 11 to force the plug 10 downwardly.

The housing 27 is shown as also including an intermediate section 52 which is screwed onto the upper end of the tapered lower section 51 and, further, is shown as including an upper section 53 which is screwed onto the upper end of the intermediate section 52. The acoustic energy source is shown as transmitting apparatus which is mounted within the sections 52 and 53.

A lateral passageway 54 is shown suitably provided in the wall of the intermediate section 52 near the lower end thereof. The passageway 54 permits the escape to the outside of any compressible fluid, such as entrapped or excess air or other gas, which is present in the housing 27 between the energy source and the upper end of the elastic column or propagating medium. Where the lower section 51 is filled with an elastic material such as rubber or the like, as aforesaid, an escape passageway may be suitably provided immediately below such material rather than immediately below the energy source, as shown.

As illustrated, the transmitting apparatus includes a lower piston-like member or hammer 55 and an upper piston-like member or plunger 56. Each of such members 55 and 56 is mounted for limited relative longitudinal movement within the housing 27 and each is normally biased or urged in a direction therein toward the other. The arrangement is such that the lower end of the upper member or plunger 56 normally rests on the adjacent upper end of the lower member or hammer 55, as shown.

The hammer 55 is shown biased or urged upwardly by a spring 57 which encircles the lower portion thereof. The spring 57 is supported at its lower end by an abutment 58 which is suitably provided in the wall of the intermediate section 52 of the housing 27. At its upper end the spring 57 engages a downwardly facing surface or shoulder 59 which is suitably provided on the hammer 55 intermediate the ends thereof.

A downwardly and outwardly tapered surface 60 is provided in the wall of the intermediate section 52 for limiting relative upward movement of the hammer 55 therein. The tapered surface 60 is shown engaging a companion surface or shoulder 61 which is suitably provided on the hammer 55 at an intermediate raised portion thereof. The arrangement is such that the action of the spring 57 normally retains the hammer 55 in its uppermost position within the housing 27, as shown.

Sealing means such as O-type sealing rings 62 and 63, respectively, are preferably provided between the wall of the housing 27 and the upper and lower end portions, respectively, of the hammer 55. Also, sealing means such as an O-type sealing ring 64 is preferably provided between the wall of the housing 27 and the intermediate raised portion of the hammer 55.

It will be noted that a lateral passageway 65 is shown provided in the wall of the housing 27 opposite the spring 57 so as to permit the escape to the outside of any fluid such as air which is displaced ahead of the downwardly facing shoulder 59 upon the hammer 55 moving downwardly within the housing 27.

As illustrated, the plunger 56 has at or near the lower end thereof an outwardly extending annular flange 66 along the periphery of which extends a recessed upwardly facing surface or abutment 67. The plunger 56 is shown biased or urged downwardly by a spring 68 the lower end of which engages the abutment 67. The upper end of the spring 68 engages a recessed downwardly facing surface or abutment 69 suitably provided on an annular ridge 70 which extends inwardly from the wall of the housing 27 intermediate the ends of the upper section 53.

As illustrated, the plunger 56 has its upper portion positioned for sliding movement within a guide sleeve 71, which is threadedly connected at its lower end to the annular ridge 70 and extends upwardly therefrom within the upper section 53. The sleeve 71 is made of a non-magnetic material such as brass and is encircled by a coil form 72 which is made of an insulating material. A solenoid winding 73 is carried by the coil form 72. The lead wires of the winding 73 are in the cable 28, which is shown extending through a lateral passageway 74 suitably provided in the wall of the upper section 53.

The housing 27 is shown closed at the upper end thereof by a plug or cap 75 which is screwed onto or otherwise detachably connected to the upper end of the section 53. The cap 75 has a downwardly extending central portion 76 which is positioned within the upper end portion of the sleeve 71 and adds lateral support thereto.

It will be noted that a chamber 77 is provided in the sleeve 71 between the upper end of the plunger 56 and the lower end of the cap 75. The arrangement is such that upon the solenoid winding 73 being energized by a control signal supplied through the cable 28, there is established a magnetic field having lines of force which act upon the plunger 56 so as to move it upwardly within the chamber 77, the force being sufficient to overcome the biasing spring 68 which tends to move the plunger 56 downwardly.

Relative upward movement of the plunger 56 in the chamber 77 due to the magnetic field is permitted to continue until its upper end engages the lower end of the cap 75. At this time, the lower end of the plunger 56 will be disposed in the housing 27 a suitable distance above the hammer 55. Upon the solenoid winding 73 being then de-energized due to the control signal disappearing, the plunger 56 is released and moves downwardly due to the weight thereof and to the action of the biasing spring 68.

It will be noted that the plunger 56 when in its normal or at rest position, as shown, is supported to some extent by the hammer 55. That is, the plunger 56 is in effect in an intermediate position prior to the winding 73 being energized to pull the plunger 56 upwardly to its striking position. The downward movement of the plunger 56 occurring upon the winding 73 being subsequently de-energized is sudden and is accompanied by sufficient force to move the plunger 56 downward beyond its at rest or intermediate position. As a result, the lower end of the plunger 56 is caused to strike a suddent blow against the upper end of the hammer 55, which is thus caused to move suddenly downwardly against the elastic column therebelow.

Such sudden downward movement of the hammer 55 applies a sudden compressional force lengthwise of the elastic column and, as a result, a pulse or plane wave of acoustic energy is transmitted and propagated downwardly through the column. Due to the action of the biasing spring 57, the hammer 55 and plunger 56 are then returned to their normal or at rest positions in the housing 27, as shown, where they remain until another control signal is supplied through the cable 28 to energize the winding 73 again.

Fluid by-pass means is preferably provided to permit the pressure of air or other fluid to equalize as between the space within the chamber 77 above the plunger 56 and the annular space around and below the lower portion of the plunger 56 upon such fluid being displaced due to longitudinal movement of the plunger 56, as aforesaid. Such fluid by-pass means is shown as including an interior passageway 78 suitably provided in the plunger 56 and vertical passageways 79 which extend through the flange 66.

The plunger 56 should, of course, be made of a suitable magnetic material such as iron or steel. Where the hammer 55 and the cap 75 are also made of magnetic materials, suitable non-magnetic substances are preferably interposed between the plunger 56 and the portions of the hammer 55 and cap 75 coming in contact therewith. Thus, an end plate 80 made of brass or the like is shown secured to the lower end of the cap 75 and a similar end plate 81 is shown secured to the lower end of the plunger 56. The non-magnetic plates 80 and 81 provide gaps or breaks in the magnetic field, thus preventing "permanent" magnetic attraction such as might interfere with the movement of the parts occurring, as aforesaid, upon the winding 73 being de-energized.

It will be noted that the wall of the housing 27 is shown in FIGURE 2 provided with a lateral passageway 82 which extends outwardly from the tapered inner surface 60 of the intermediate section 52. In addition, a lateral passageway 83 is shown in FIGURE 2 extending through the wall of the plug container 24 near the upper end thereof.

The walls defining the passageways 82 and 83 are suitably threaded to make connection with a tubing 84 which is shown connected thereto. The arrangement is such that the pressure of fluid, such as the displacing liquid 14, pumped into the plug container 24 is supplied through the passageway 83, tubing 84, and pasageway 82 to the intermediate section 52 of the housing 27 where it contacts and acts downwardly against the upwardly facing surface or shoulder 61 of the hammer 55. This fluid pressure acting downwardly against the shoulder 61 tends to balance out the fluid presure which is in the lower section 51 of the housing 27 and is acting upwardly against the lower end of the hammer 55. As a result of this "pressure balance" arrangement, a greater amount of energy is transmitted into the elastic column upon the plunger 56 striking the hammer 55 and moving it suddenly downwardly against the upper end of the column.

In commencing a cementing operation using the arrangement of FIGURE 1, the bottom plug 18 is inserted in the plug container 24 by first removing the housing 27 and then manually or otherwise positioning the plug 18 so that the upper end thereof is disposed in the container 24 below the lower branch pipe 26. The housing 27 is then replaced and the cement mixture 13 is pumped from a suitable source (not shown) through the pipe 26 and thence downwardly through the casing 11, forcing the plug 18 downwardly ahead of it.

After a desired quantity of the cement mixture 13 has been thus introduced into the casing 11, pumping thereof is discontinued and the housing 27 is again removed to permit insertion of the top plug 10. The top plug 10 is positioned in the container 24 below the upper branch pipe 25, whereupon the housing 27 is replaced. The displacing liquid 14 is then pumped from a suitable source (not shown) through the upper pipe 25 into the container 24 and then downwardly through the casing 11, forcing the plugs 10 and 18 and the interposed cement mixture 13 downwardly ahead of it.

As the pumping is continued, the bottom plug 18 approaches and then reaches its lowermost or at rest position against the plug seat 19. Thereafter, as the pumping is continued, sufficient pressure builds up in the casing 11 above the frangible plate or diaphragm in the bottom plug 18 to rupture it. When this occurs, the cement mixture 13 escapes from the casing 11 through the lower end thereof and thence flows upwardly into place around the casing 11, forcing any fluid 20 upwardly toward the mouth of the bore hole 12 and then through the pipe 22 into the nearly slush pit or other receptacle.

The pumping of the displacing liquid 14 is continued until the top plug 10 reaches its lowermost or at rest position against a seat which is provided therefor on top of the bottom plug 18. At this time substantially all of the cement mixture 13 wil be displaced from the casing 11.

In one way of proceeding using the illustrated form of the present invention, the detecting and locating apparatus is placed in operation by operating a switch (not shown) on the recording and indicating device 40 as soon as the top plug 10 begins to move downwardly through the casing 11. The apparatus then remains in continuous operation until the switch is turned off, which will ordinarily be after the plug 10 has reached its lowermost or at rest position in the well, that is, on top of the bottom plug 18.

Upon the switch on the device 40 being turned on, the chart 47 begins to move slowly upwardly and the switching and circuit means provided in the device 40 begins to supply a series of uniformly spaced control signals through the cable 28 to periodically energize the solenoid winding 73 mounted in the housing 27. As hereinbefore described, for each control signal thus supplied, a pulse or plane wave of acoustic energy is transmitted and propagated downwardly through the elastic column, a series of uniformly spaced pulses or waves being transmitted as the apparatus remains in operation.

Upon a pulse or plane wave in the series being transmitted, it travels downwardly through the displacing liquid 14 until it reaches the reflector surface 17 which, as hereinbefore described, provides an acoustical discontinuity in the propagating medium.

Since each of the microphones 29 and 30 is responsive to acoustic energy arriving thereat while traveling either upwardly or downwardly through the elastic column, the transmitted pulse or wave is picked-up or received as it passes downwardly through the liquid 14 in the plug container 24.

In this connection, it should be noted that pumps such as will ordinarily be used to pump the displacing liquid 14 into the well are themselves transmitters of acoustic energy. Since the liquid 14 is pumped into the upper end of the elastic column and downwardly against the liquid or liquid mixtures already therein, any accompanying surges or other pressure disturbances in the liquid 14 tend to compress the column lengthwise and be transmitted downwardly as pulses or waves of acoustic energy. While many of these downwardly traveling pulses or waves may be of sufficient intensity to reach the microphones 29 and 30, and in the early stages of the pumping operation may reach the reflector surface 17, it is unlikely that any upwardly traveling reflected or echo signals arising therefrom will be of sufficient intensity to reach the microphones 29 and 30, particularly so after the reflector surface 17 has moved downwardly some distance into the elastic column.

An important feature of the arrangement illustrated resides in the fact that the devices or circuitry connected beween the microphones 29 and 30 and the recording and indicating device 40 in effect cancel out or substantially eliminate any output signals of the microphones 29 and 30 resulting from the aforesaid and other downwardly traveling acoustic energy.

In this connection, it will be noted that acoustic energy traveling downwardly through the elastic column first arrives at the upper microphone 29, producing an output signal which is supplied through the cable 43 directly to the adder circuit 42. A short time later the downwardly traveling acoustic energy arrives at the lower microphone 30, producing an output signal which is inverted, but not delayed, in the circuit 32 and then is supplied through the cable 33 to the adder circuit 34. By this time, the output signal of the upper microphone 29 has passed through the adder circuit 42, in which no cancelling or opposing signal was present, and also through the delay device or circuit 45. Since the delay occurring in the circuit 45 corresponds to the additional travel time of the acoustic energy picked-up or received by the lower microphone 30, the output signal of the upper microphone 29 is supplied through the cable 46 to the adder circuit 34 at the same time that the inverted output signal of the lower microphone 30 is supplied thereto through the cable 33. Since the signals are of substantially the same amplitude and are of opposite polarity signal cancellation occurs in the adder circuit 34 and no signal is supplied to the recording and indicating device 40 in this instance.

Upon a transmitted pulse or wave in the series traveling downwardly through the liquid 14 sufficiently to reach the reflector surface 17 on the top cementing plug 10, a portion of the energy thereof is reflected in the form of a signal or echo which travels upwardly through the liquid 14 towards the energy source. Another portion of the energy of the transmitted pulse or wave in effect is retransmitted by or otherwise passes through the acoustical discontinuity existing at the reflector surface 17 and continues to travel in a downwardly direction through the elastic column.

Such downwardly continuing pulse or wave will ordinarily be of sufficient intensity to pass through the rubber portion of the plug 10 and then through the cement mixture 13, the bottom plug 18 and any fluid 20 therebelow until it reaches the bottom surface 21 which, as hereinbefore described, provides a stationary reference acoustical discontinuity in the propagating medium.

Upon a downwardly continuing pulse or wave reaching the bottom surface 21, another portion of the transmitted energy is reflected in the form of a signal or echo which travels upwardly through the elastic column toward the energy source. It is apparent that, due to the greater distance and travel time involved, any signal or echo reflected from the bottom surface 21 will upon arriving at any point in the elastic column above the reflector surface 17 be spaced in the time behind the signal or echo previously reflected from the surface 17 during the same cycle of operation of the transmitting apparatus.

It will be noted that any acoustic energy, such as one of the reflected or echo signals obtained from the surfaces 17 and 21, will while traveling upwardly through the container 24 arrive first at the lower microphone 30 and a short time later will arrive at the upper microphone 29. The lower microphone 30 picks-up or receives the energy arriving thereat and produces an output signal which is inverted, but not delayed, in the circuit 32 and then is supplied through the cable 33 to the adder circuit 34. A short time later the upper microphone 29 picks-up or receives the energy and produces an output signal which is supplied directly through the cable 43 to the adder circuit 42. By this time, the inverted output signal of the lower microphone 30 has passed through the adder circuit 34, in which no cancelling or opposing signal was present, and also through the delay device or circuit 36. Since the delay occurring in the circuit 36 corresponds to the additional travel time of the acoustic energy pick-up or received by the upper microphone 29, the inverted and delayed output signal of the lower microphone 30 is supplied through the cable 41 to the adder circuit 42 at the same time that the output signal of the upper microphone 29 is supplied thereto through the cable 43. Since the signals are of substantially the same amplitude and are of opposite polarity, signal cancellation occurs in the adder circuit 42.

At the same time that signal cancellation is thus occurring in the adder circuit 42, the inverted and delayed output signal of the lower microphone 30 is supplied through the separate cable 37 to the amplifier circuit 38 and, after amplification thereof, is supplied through the cable 39 to the recording and indicating device 40.

The reflected or echo signals obtained from the surfaces 17 and 21 during a particular cycle of operation of the transmitting apparatus arrive in succession at the lower microphone 30 and, for each, a signal is supplied through the cable 39 to the recording and indicating device 40, as aforesaid. As hereinbefore stated, the signals thus supplied to the device 40 produce marks which appear on the chart 47 from left to right in the order of their arrival.

On the chart 47, a point on the solid line 48 coincides with the beginning of each cycle of operation of the transmitting apparatus, that is, with the time of transmission of a pulse or plane wave at the energy source within the housing 27. Accordingly, the marks made during any particular cycle of operation appear to the right of the line 48. Since the chart 47 is continuously moving upwardly at a slow rate, the marks made during successive cycles of operation appear from left to right, respectively, as broken lines 49 and 50, respectively, each of which extends in a generally downward direction along the chart 47.

Since the reflector surface 17 is always closer to the acoustic energy source and detectors than is the bottom surface 21, it is apparent that each of the marks on the left forming the broken line 49 represents a reflected or echo signal obtained from the surface 17 while each of the marks on the right forming the broken line 50 represents a reflected or echo signal obtained from the surface 21.

It will be noted that the broken line 50 is shown extending vertically along the right side of the chart 47 in parallel spaced relation to the solid reference line 48, while the broken line 49 is shown beginning at or near the upper end of the solid line 48 and extending diagonally downward along the chart 47 toward a meeting point with the broken line 50. The length and positions of the lines 49 and 50 are shown as they will ordinarily appear during the stage of operation when the top plug 10 is approaching, but has not quite reached, its lowermost position in the well.

It will be appreciated by those skilled in the art that at least an indication of the elevation or depth of the top plug 10 in the well during any particular cycle of operation of the transmitting apparatus can be derived from information made available by measuring the horizontal distance on the chart 47 separating the solid line 48 and the particular mark on the line 49 which was made during that cycle. This measurement is an indication of the time required for acoustic energy to make a round trip through the portion of the elastic column above the reflector surface 17. However, for such an indication to be accurate it will be necessary, for one thing, to adjust or calibrate the device 40 so as to compensate for the fact that the acoustic energy is not transmitted and received at the same point in the propagating medium. In this connection it should be noted that the delay occurring in the device or circuit 36 partially compensates for the spacing between the acoustic energy source and the lower microphone 30.

It will also be appreciated by those skilled in the art that where, as is usually the case, the elevation or depth of the bottom surface 21 of the bore hole 12 is known with reasonable accuracy, at least an indication of the elevation or depth of the top plug 10 during any particular cycle of operation of the transmitting apparatus can be derived from information made available by measuring the distance on the chart 47 separating the respective marks on the broken lines 49 and 50 which were made during that cycle. In this instance it will not be necessary to compensate for the spacing between the points of transmission and reception of the acoustic energy, since an indication of the travel time of acoustic energy passing only through the lower portion of the elastic column is taken from the chart 47. Also, for the same reason, it is not necessary in this instance that the solid reference line 48 coincide exactly with the time of transmission of the pulse or wave giving rise to the reflected or echo signals which are reperesented by the marks being measured, although both marks should represent reflected or echo signals obtained from the same transmitted pulse or wave.

In deriving an indication of the elevation or depth of the top plug 10 using either of the foregoing travel time measurements, it will be necessary to have available reasonably accurate information concerning the acoustic energy propagation characteristics of the particular portion of the elastic column which is involved. It should be noted that the composition of the liquids or liquid mixtures making up the elastic column will ordinarily vary from operation to operation. Also, the ratio of a particular liquid, such as the displacing liquid 14, and/or of a particular liquid mixture, such as the cement mixture 13, to the total liquids or liquid mixtures in the column will vary during the course of performing a given operation.

Where the displacing liquid 14 is a homogeneous liquid, such as water or oil, the propagation characteristics of the portion of the elastic column above the reflector surface 17 will ordinarily either be known with reasonable accuracy or can be obtained without too much difficulty.

In actual practice it is not as important to the successful performance of the well cementing operation to know the exact elevation or depth of the plug 10 in the casing 11 at any particular time as it is to know with certainty that the plug 10 continues to move downwardly as the pumping of the displacing liquid 14 continues and to know with certainty when the plug 10 is approaching its lowermost or at rest position and, with reasonable accuracy, the occasion of its arrival at such position.

This more desirable information is quite accurately obtainable using the illustrated form of the present invention, even where information is not available concerning the propagation characteristics of the various portions of the elastic column. Thus, an operator at the surface can observe the direction of the broken line 49 as it is formed on the chart 47 and thereby ascertain the general rate of descent of the plug 10 through the casing 11. If the direction of the line 49 changes toward the vertical plane, as the pumping continues, this indicates that the rate of descent of the plug 10 is becoming slower. If the change is toward the horizontal plane, this indicates that the rate of descent of the plug 10 is increasing.

Also, the operator can observe when the line 49 approaches the line 50 and thereby ascertain when the plug 10 is approaching the bottom surface 21 of the bore hole 12. If desired, the pumping rate of the liquid 14 may be reduced as the plug 10 approaches its lowermost or at rest position, thus reducing the likelihood of undesirably high pressure being built up in the casing 11. When this is done the rate of descent of the plug 10 will decrease. As the plug 10 reaches its lowermost or at rest position, the line 49 will almost merge with the line 50. If the detecting and locating apparatus is kept in operation after the plug 10 has stopped at any time during its downward descent, the portions of the lines 49 and 50 thereafter formed will extend in parallel spaced relation to each other. If at such time the plug 10 is in its lowermost or at rest position, the spacing between the extended portions of the lines 49 and 50 will be very close.

It will be appreciated by those skilled in the art that the illustrated form of the invention enables a much greater control to be exercised over the pumping operation than has heretofore been possible. Also, a more precise determination may be made of changes occurring in the location of the plug 10 as the pumping continues.

It should be pointed out that it is possible that in some instances, such as in cementing operations performed in deep wells, reflected or echo signals may not always be obtained from the bottom surface 21 or, if obtained, may not always be of sufficient intensity to be detected or received at the microphones 29 and 30. The possibility of this situation existing is greater during the early stages of the pumping operation when a large proportion of the elastic column consists of the cement mixture 13, which will commonly per unit length thereof, have a greater tendency to attenuate the acoustic energy than will the displacing liquid 14.

For this reason, considerable attention should be given to the construction of the transmitting apparatus, particularly to the inclusion of features, such as the pressure equalizing arrangements herein disclosed, which result in increasing the amount of energy propagated through the elastic column. Also, considerable attention should be given to the selection of the acoustical energy detectors or microphones. An advantage of the arrangement herein disclosed arises from the fact that very sensitive microphones may be employed, since provision is included for substantially cancelling pumping noises and other downwardly travelling acoustic energy with otherwise might result in false measurements or readings.

While the invention has been described herein with particular reference to specific embodiments thereof, it is understood that various modifications and alternative arrangements are also within the spirit of the invention, which is best defined by the scope of the appended claims.

What is claimed is:

1. Apparatus for detecting and obtaining at least an indication of the location of an acoustical discontinuity denoting a remote boundary along a liquid column comprising a source of acoustic energy mounted adjacent an end of said column and adapted to transmit and propagate a plane wave of acoustic energy lengthwise through at least the portion of said column under investigation, means for detecting at a pair of points spaced longitudinally of said column acoustic energy traveling in either direction through said liquid to obtain a first pair of intervally spaced signals each representing the transmitted wave traveling in a direction away from said source and to subsequently obtain a second pair of similarly spaced signals each representing a portion of the energy of the transmitted wave traveling in a direction toward said source after being reflected by said discontinuity, means for inverting one of the signals of each pair, means for delaying the first signal of each pair for a period of time substantially equal to the spacing between the signals of said pair, means for vectorially adding together the inverted and other signal of said first pair after delay of the first signal thereof whereby the signals of said first pair substantially cancel each other, and means for selectively recording the time relationship between the transmission of said plane wave and the obtainment of the delayed first signal of said second pair.

2. Apparatus for detecting and obtaining at least an indication of the relative location of a plurality of acoustical discontinuities each denoting a boundary along a liquid column comprising a source of acoustic energy mounted adjacent an end of said column and adapted to transmit and propagate a plane wave of acoustic energy lengthwise through at least the portion of said column under investigation, mean for detecting at a pair of points spaced longitudinally of said column acoustic energy traveling in either direction through said column to obtain a multiplicity of pairs of intervally spaced signals, a first pair of said signals representing the transmitted wave arriving at such points while traveling in a direction away from said source, a second and each subsequent pair of said signals representing a portion of the energy of the transmitted wave arriving at such points while traveling in a direction toward said source after being reflected by one of said discontinuities, means for inverting one of the signals of each pair, means for delaying the first signal of each pair for a period of time substantially equal to the spacing between the signals of said pair, means for vectorially adding together the inverted and other signal of said first pair after delay of the first signal thereof whereby the signals of said first pair substantially cancel each other, and means for selectively recording the time relationship between the delayed first signals of said second and each subsequent pair.

3. Apparatus for detecting changes in the location of an acoustical discontinuity denoting a movable boundary along a liquid column comprising a source of acoustic energy mounted adjacent an end of said column and adapted to transmit and propagate a plurality of intervally spaced plane waves of acoustic energy lengthwise through at least the portion of said column under investigation, means for detecting at a pair of points spaced longitudinally of said column acoustic energy traveling in either direction through said column to obtain a multiplicity of pairs of intervally spaced signals, certain of said signal pairs each representing a transmitted wave arriving at such points while traveling in a direction away from said source, others of said signal pairs each representing a portion of the energy of a transmitted wave arriving at such points while traveling in a direction toward said source after being reflected by said discontinuity, means for inverting one of the signals of each pair, means for delaying the first signal of each pair for a period of time substantially equal to the spacing between the signals of said pair, means for vertorially adding together the inverted and other signal of each pair representing acoustic energy traveling in a direction away from said source after delay of the first signal thereof whereby the signals of each of these pairs tend to cancel each other, and means for selectively recording the time relationship between the transmission of each of a plurality of said plane waves and the obtainment of the delayed first signal of the pair representing a reflected portion of the energy of said wave.

4. Apparatus as claimed in claim 3 wherein said acoustic energy source is adapted to transmit plane waves which are spaced apart sufficiently to permit a reflected portion of the energy of each transmitted wave to be detected at said spaced points prior to the transmission of the next succeeding wave.

5. In apparatus for use in a well cementing operation wherein a cementing plug is moved downwardly through a well conduit ahead of a displacing liquid the acoustic impedance of which is substantially different from that of at least a portion of said plug, the combination of a source of acoustic energy mounted adjacent the upper end of said conduit for transmitting a series of uniformly spaced plane waves of acoustic energy which are propagated downwardly through said displacing liquid and other elastic substances throughout the length of said conduit, acoustic energy detecting means mounted at each of a pair of points spaced longitudinally of said conduit above said plug for detecting acoustic energy arriving at such points while traveling in either direction through said displacing liquid, whereby a multiplicity of pairs of intervally spaced signals may be obtained at such points, a first series of said signal pairs representing the energy of said transmitted waves and any other acoustic energy arriving at such spaced points while traveling downwardly through said displacing liquid, a second series of said signal pairs representing portions of the energy of said transmitted waves arriving at such spaced points while traveling upwardly through said displacing liquid after being reflected by said plug, a third series of said signal pairs representing portions of the energy of said transmitted waves arriving at such spaced points while traveling upwardly through said displacing liquid after being reflected from the bottom of said well, means for inverting one signal of each signal pair, means for delaying the first signal of each signal pair for a period of time substantially equal to the spacing between the signals of said pair, means for vectorially adding together the inverted and other of each signal pair in said first series after delay of the first signal thereof, whereby the signals representing downwardly traveling acoustic energy substantially cancel each other, means for vectorially adding together the inverted and other of each signal pair in said second and third series after delay of the first signal of each pair whereby said delayed first signal substantially cancels the other signal of said pair, and means for recording the time relationship between the delayed first signal of each pair in said second series and the delayed first signal of the corresponding pair in said third series which represents a reflected portion of the energy of the same transmitted wave.

6. Apparatus as claimed in claim 5 including means for controlling said acoustic energy source so that successively transmitted waves in said series are spaced apart sufficiently to permit a portion of the energy of each wave after being reflected from the bottom of said well to be detected at said spaced points prior to the transmission of the next wave in said series.

7. Apparatus for determining the depth of a plug in a well comprising a conduit having liquid therein, a source of acoustic energy operatively coupled to said liquid, acoustic energy detecting means operatively coupled to said liquid adjacent the top portion of said conduit, and circuit means operatively connected to said detecting means for determining the distance of said plug therefrom.

8. Apparatus for determining the depth of a plug in a well comprising a conduit having liquid therein extending downwardly into the well, a source of acoustic energy operatively coupled to said liquid for transmitting a plane wave downwardly therein, acoustic energy detecting means operatively coupled to said liquid adjacent the top portion of said conduit, and circuit means operatively connected to said detecting means for determining the distance of said plug therefrom.

9. Apparatus for determining the depth of a plug in a well comprising a conduit having liquid therein extending downwardly into the well at least to the depth of said plug, a source of acoustic energy near the mouth of the well operatively coupled to said liquid for transmitting a plane wave downwardly therein, acoustic energy detecting means operatively coupled to said liquid adjacent the top portion of said conduit, and circuit means operatively connected to said detecting means for determining the distance of said plug therefrom.

10. Apparatus as claimed in claim 9 wherein said circuit means includes means for obtaining signals indicating the time relationship between the transmission of said plane wave and the arrival at said detecting means of a reflected portion of the energy thereof.

11. Apparatus as claimed in claim 9 wherein said circuit means includes means for obtaining signals representing the time relationship between each of a plurality of reflected portions of the energy of said plane wave arriving in succession at said detecting means.

12. Apparatus as claimed in claim 9 wherein said circuit means includes means for obtaining signals including at least one signal representing the arrival at said detecting means of upwardly traveling acoustic energy reflected by said plug and including at least one other signal representing the arrival at said detecting means of upwardly traveling acoustic energy reflected by an acoustical discontinuity located in the well below said plug.

13. Apparatus as claimed in claim 9 wherein said acoustic energy detecting means includes at least two microphones vertically spaced with respect to each other and wherein said circuit means includes means for selectively obtaining signals representing the arrival of upwardly traveling acoustic energy at one of said microphones to the exclusion of signals representing the arrival of other acoustic energy at said detecting means.

14. Apparatus for determining the depth of a plug in a well comprising a conduit having liquid therein extending downwardly into the well at least to the depth of said plug, a source of acoustic energy near the mouth of the well operatively coupled to said liquid for transmitting a plurality of intervally spaced plane waves downwardly therein, acoustic energy detecting means operatively coupled to said liquid adjacent the top portion of said conduit, and circuit means operatively connected to said detecting means for determining the distance of said plug therefrom.

15. Apparatus as claimed in claim 14 wherein said transmitted waves are spaced apart sufficiently to permit at least the portion of the energy of each wave reflected by said plug to arrive at said detecting means prior to the transmission of the next succeeding wave.

16. Apparatus as claimed in claim 14 wherein said circuit means includes means for obtaining signals representing the time relationship between the transmission of each of a plurality of said transmitted waves and the arrival at said detecting means of a reflected portion of the energy of the same wave.

17. Apparatus as claimed in claim 14 wherein said circuit means includes means for obtaining signals representing, for each of a plurality of said transmitted waves, the time relationship between at least two reflected portions of the energy thereof arriving in succession at said detecting means and wherein said transmitted waves are spaced sufficiently apart to permit said at least two reflected portions of the energy of each wave to arrive at said detecting means prior to the transmission of the next succeeding wave.

18. Apparatus as claimed in claim 14 wherein said acoustic energy detecting means includes at least two microphones vertically spaced with respect to each other and wherein said circuit means includes means for obtaining signals representing, for each of a plurality of said transmitted waves, the time relationship between the transmission of said wave and the arrival at one of said microphones of a reflected portion of the energy of the same wave.

19. Apparatus as claimed in claim 14 wherein said acoustic energy detecting means includes at least two microphones vertically spaced with respect to each other, wherein said circuit means includes means for obtaining signals representing, for each of a plurality of said transmitted waves, the time relationship between at least two reflected portions of the energy of the same wave arriving in succession at said detecting means, and wherein said transmitted waves are spaced sufficiently apart to permit said at least two reflected portions of the energy of each wave to arrive at said detecting means prior to the transmission of the next succeeding wave.

20. Apparatus as claimed in claim 19 wherein said transmitted waves are spaced sufficiently apart to permit a first reflected portion of the energy of each wave reflected upon reaching said plug in the well to arrive at said detecting means and also to permit a second reected portion of the energy of the same wave reflected upon reaching the bottom of the well to arrive at said detecting means prior to the transmission of the next succeeding wave.

References Cited in the file of this patent

UNITED STATES PATENTS

| | | |
|---|---|---|
| 2,016,907 | Rice | Oct. 8, 1935 |
| 2,096,017 | Williams | Oct. 19, 1937 |
| 2,131,993 | Wittkuhns et al. | Oct. 4, 1938 |
| 2,208,603 | Scaramucci | July 23, 1940 |
| 2,209,944 | Walker | July 30, 1940 |
| 2,232,476 | Ritzmann | Feb. 18, 1941 |
| 2,283,429 | Ennis | May 19, 1942 |
| 2,558,924 | Blake | July 3, 1951 |
| 2,656,003 | Poulter | Oct. 20, 1953 |
| 2,740,945 | Howes | Apr. 3, 1956 |
| 2,760,591 | White et al. | Aug. 28, 1956 |
| 2,769,966 | Rines | Nov. 6, 1956 |
| 2,775,748 | Rod et al. | Dec. 25, 1956 |